United States Patent
Park (10) Patent No.: US 8,868,285 B2
(45) Date of Patent: Oct. 21, 2014

(54) WIRELESS DIAGNOSTIC MODULE AND WIRELESS DIAGNOSTIC SYSTEM USING THE SAME

(71) Applicant: LSIS Co., Ltd., Anyang-si (KR)

(72) Inventor: You Hyun Park, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/910,900

(22) Filed: Jun. 5, 2013

(65) Prior Publication Data

US 2014/0012458 A1 Jan. 9, 2014

(30) Foreign Application Priority Data

Jul. 5, 2012 (KR) .................. 10-2012-0073200

(51) Int. Cl.
- *G06F 7/00* (2006.01)
- *G06F 17/00* (2006.01)
- *G07C 5/08* (2006.01)
- *G07C 5/00* (2006.01)

(52) U.S. Cl.
CPC .............. *G06F 17/00* (2013.01); *G07C 5/0808* (2013.01); *G07C 5/008* (2013.01)
USPC ........................................ 701/31.4

(58) Field of Classification Search
USPC ........... 701/31.4, 31.5, 33.2, 33.3, 34.4, 34.3; 455/550.1; 340/426.13, 439
See application file for complete search history.

(56) References Cited

U.S. PATENT DOCUMENTS

| | | | |
|---|---|---|---|
| 7,149,206 B2* | 12/2006 | Pruzan et al. ................. | 370/349 |
| 7,280,898 B2* | 10/2007 | Lesesky et al. .............. | 701/31.5 |
| 2004/0142722 A1* | 7/2004 | Everett ........................ | 455/550.1 |
| 2007/0185626 A1* | 8/2007 | Kaneko ............................ | 701/2 |
| 2008/0312786 A1* | 12/2008 | Day ................................. | 701/33 |
| 2011/0137510 A1* | 6/2011 | Tsai et al. ...................... | 701/29 |
| 2013/0054082 A1* | 2/2013 | Costantino ................... | 701/29.6 |
| 2014/0019000 A1* | 1/2014 | Ruther et al. ................ | 701/31.4 |

FOREIGN PATENT DOCUMENTS

KR  10-2003-0068328  8/2003

OTHER PUBLICATIONS

Korean Intellectual Property Office Application Serial No. 10-2012-0073200, Office Action dated Aug. 14, 2013, 3 pages.

* cited by examiner

*Primary Examiner* — Mary Cheung
*Assistant Examiner* — Rodney Butler
(74) *Attorney, Agent, or Firm* — Lee, Hong, Degerman, Kang & Waimey

(57) ABSTRACT

A wireless diagnostic module includes a connection port connected to a connector provided in a first appliance; a first signal transceiving unit to transceive a signal corresponding to a first communication protocol by making communication with the first appliance connected through the connection port; a signal converting unit to convert the signal corresponding to the first communication protocol transmitted through the first signal transceiving unit into a signal corresponding to a second communication protocol; and a second signal transceiving unit to transmit the signal corresponding to the second communication protocol, which is converted through the signal converting unit, to a second appliance, wherein the first communication protocol comprises at least one of ISO, KWP, PWM, CAN and VWP supported by the connector provided in the first appliance, and the second communication protocol comprises a wireless communication protocol for wireless communication between the first and second appliances.

14 Claims, 5 Drawing Sheets

WIRELESS DIAGNOSTIC MODULE AND WIRELESS DIAGNOSTIC SYSTEM USING THE SAME

CROSS-REFERENCE TO RELATED APPLICATIONS

Pursuant to 35 U.S.C. §119(a), this application claims the benefit of earlier filing date and right of priority to Korean Patent Application No. 10-2012-0073200, filed on Jul. 5, 2012, the contents of which is incorporated by reference herein in its entirety.

BACKGROUND

The embodiment relates to a wireless diagnostic module. In more particular, the embodiment relates to a wireless diagnostic module capable of enabling the wireless connection with an internal CAN communication protocol system of a vehicle from an outside of the vehicle through diagnostic equipment for the vehicle, and a wireless diagnostic system using the same.

In general, a vehicle is provided therein with an on board diagnostic (OBD) connector and the state of the vehicle may be diagnosed by using the OBD connector.

In other words, when a user wonders the failure state of parts of the vehicle or wants to diagnose the breakdown of the vehicle, the user may perform the self-diagnosing work for the vehicle regardless of time by connecting diagnostic equipment to the diagnostic connector.

Figure 1:
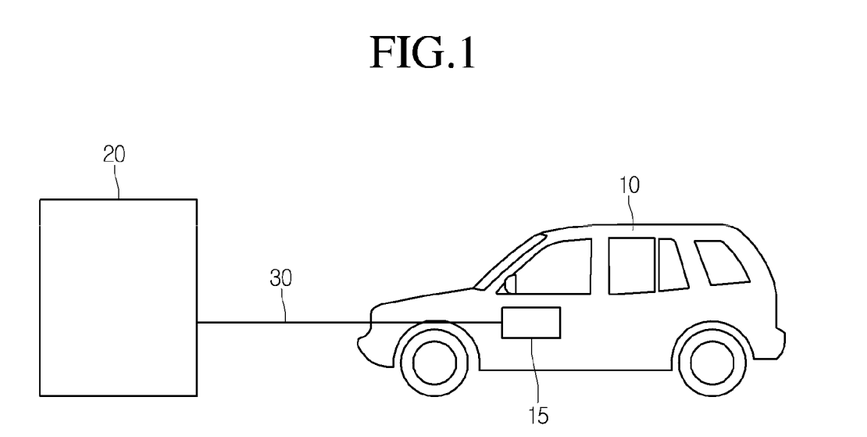
FIG. 1 is a view to explain a self-diagnostic system according to the related art.

FIG. 1 is a view to explain a self-diagnostic system according to the related art.

Referring to FIG. 1, the self-diagnostic system according to the related art includes a vehicle 10 including a diagnostic connector 15 and diagnostic equipment 20 connected to the diagnostic connector 15 through a cable 30.

The diagnostic connector 15 is connected to the internal CAN communication network of the vehicle 10.

The cable 30 has one end formed in a shape corresponding to that of the diagnostic connector 15 and an opposite end formed in a shape corresponding to that of a connector provided in the diagnostic equipment 20. Accordingly, the cable 30 forms the transmission path of a signal generated from the diagnostic equipment 20 or a signal generated from the vehicle 10.

Regarding the above operation, the diagnostic equipment 20 is connected to the diagnostic connector 15 provided in the vehicle 10 through the cable 30.

In addition, the diagnostic equipment 20 transmits a CAN message having a predetermined format to the vehicle 10 through the cable 30.

If the CAN message is transmitted to the vehicle 10, electronic control units provided in the vehicle 10 transmit various information to the diagnostic equipment 20 through the cable 30 in response to the CAN message.

The diagnostic equipment 20 converts the transmitted various information in the form that can be displayed, and displays the converted various information to a user.

However, according to the above self-diagnostic system, since the external diagnostic equipment of the vehicle is mutually connected with the internal CAN network system of the vehicle through a wired scheme, a user must open the door of the vehicle and connect the diagnostic equipment 20 to the diagnostic connector 15 whenever the user diagnoses the vehicle.

In addition, according to the above self-diagnostic system, since the diagnostic equipment is connected with the vehicle through the wired scheme, the operating radius is restricted due to the length of a communication line.

SUMMARY

The embodiment provides wireless diagnostic modules which are connected to diagnostic equipment and a diagnostic connector of a vehicle, respectively, so that the vehicle and the diagnostic equipment can mutually exchange wireless signals.

In addition, the embodiment provides a self-diagnostic system, which allows diagnostic equipment and a vehicle to make wireless communication with each other for the purpose of self-diagnosis.

Technical objects of the embodiment may not be limited to the above object and other technical objects of the embodiment will be apparent to those skilled in the art from the following description.

According to the embodiment, there is provided a wireless diagnostic module. The wireless diagnostic module includes a connection port connected to a connector provided in a first appliance, a first signal transceiving unit to transceive a signal corresponding to a first communication protocol by making communication with the first appliance connected through the connection port, a signal converting unit to convert the signal corresponding to the first communication protocol transmitted through the first signal transceiving unit into a signal corresponding to a second communication protocol, and a second signal transceiving unit to transmit the signal corresponding to the second communication protocol, which is converted through the signal converting unit, to a second appliance. The first communication protocol comprises at least one of ISO, KWP, PWM, CAN and VWP supported by the connector provided in the first appliance, and the second communication protocol comprises a wireless communication protocol for wireless communication between the first and second appliances.

In addition, the second signal transceiving unit receives a signal corresponding to the second communication protocol from the second appliance and outputs the signal corresponding to the second communication protocol to the signal converting unit, and the signal converting unit converts the signal corresponding to the second communication protocol, which is output through the second signal transceiving unit, into a signal corresponding to the first communication protocol, and outputs the signal corresponding to the first communication protocol to the first signal transceiving unit.

In addition, the first appliance is a vehicle, the second appliance is diagnostic equipment for diagnosis of the vehicle, and the connector includes an on board diagnostics (OBD) connector provided in the vehicle.

Further, the first appliance is diagnostic equipment for diagnosis of a vehicle, the second appliance is the vehicle, and the connector is provided in the diagnostic equipment.

In addition, the connection port is inserted into the connector as the connection port has a shape corresponding to a shape of the connector provided in the first appliance.

In addition, a signal received from the second appliance and transmitted to the first appliance is a diagnosis message for internal diagnosis of the vehicle, and a signal received from the first appliance and transmitted to the second appliance includes self-diagnosis information generated in response to the diagnosis message.

In addition, a signal received from the first appliance and transmitted to the second appliance is a diagnosis message for diagnosis of the second appliance, and a signal received from the second appliance and transmitted to the first appliance includes self-diagnosis information of the second appliance generated in response to the diagnosis message.

As described above, according to the embodiment, since the external diagnostic equipment of the vehicle is wirelessly connected to the internal CAN network system of the vehicle, a user may not open the door of the vehicle to connect the diagnostic equipment to the diagnostic connector in every self-diagnosis.

In addition, according to the embodiment, since the diagnostic equipment is wirelessly connected to the vehicle, the working radius for the self-diagnosis is not restricted. Accordingly, the self-diagnosis of the vehicle can be more effectively performed.

In addition, according to the embodiment, the wireless diagnostic module, which can be connected to existing diagnostic equipment and a vehicle, is provided, thereby providing a wireless diagnostic environment capable of wirelessly diagnosing a vehicle without the change or the replacement of an existing device.

DETAILED DESCRIPTION OF THE EMBODIMENTS

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

The embodiment discloses a wireless diagnostic module and a wireless diagnostic system, in which a wireless diagnostic environment capable of wirelessly diagnosing a vehicle without changing or replacing an existing device can be provided by providing wireless diagnostic modules that can be connected to existing diagnostic equipment and the vehicle, respectively.

Figure 2:
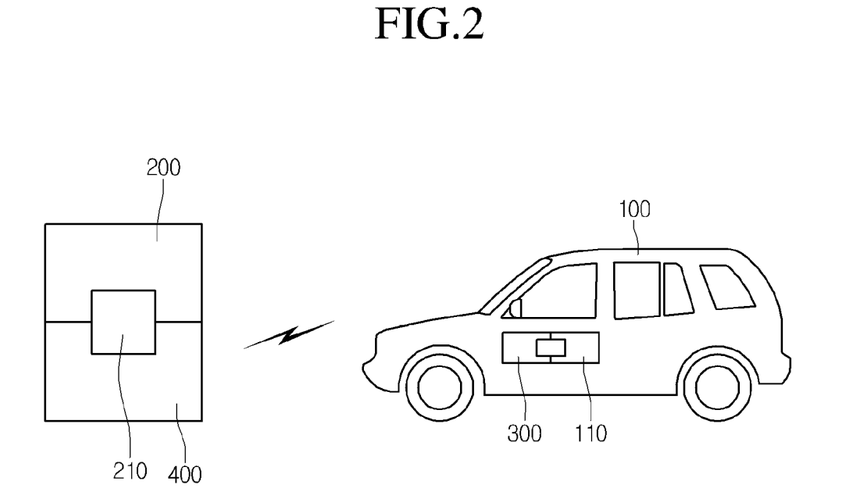
FIG. 2 is a schematic view showing a wireless diagnostic system according to the embodiment.

FIG. 2 is a schematic view showing a wireless diagnostic system according to the embodiment.

Referring to FIG. 2, the wireless diagnostic system mainly includes a vehicle 100, diagnostic equipment 200, a first wireless diagnostic module 300, and a second wireless diagnostic module 400.

The vehicle 100 may include one of a general vehicle using energy such as gasoline, diesel, and liquid petroleum gas (LPG), which belong to fossil fuel, an electric vehicle (EV), a hybrid electric vehicle using both of fossil fuel and electric energy, and a fuel cell electric vehicle (FCEV).

The EV is an eco-friendly vehicle which is supplied with power from a battery, controls an electric motor by a motor controller representatively including an inverter to achieve the optimal efficiency, and substitutes an engine with the electric motor so that toxic gas is not discharged yet all.

The vehicle 100 may include an engine and a motor/power generating unit.

The vehicle 100 has various driving wheels driven by a power source. The vehicle 100 has front wheels as the driving wheels in the case of a front wheel drive vehicle, and has rear wheels as the driving wheels in the case of a rear wheel drive vehicle.

The motor/power generating unit is a unit selectively acting as a motor or a power generator according to the driving states thereof, which is generally known to those skilled in the art.

The vehicle 100 includes a diagnostic connector 110 used to self-diagnose various internal parts provided in the vehicle.

The diagnostic connector 110 is installed in a specific region (e.g., under of a dash board or at the lateral side of the dash board) of the vehicle 100 to provide the self-diagnosis information or the operation information of the vehicle 100.

The operation information may include the RPM, the temperature, and the speed of an engine.

The diagnostic connector 110 is provided to all vehicles in compliance with the OBD regulation.

The diagnostic connector 110 makes self-diagnosis communication with an electronic control unit (ECU) in a vehicle to receive the self-diagnosis information from the ECU. In addition, the diagnostic connector 110 receives the operation information including the RPM, the temperature, and the speed of the engine.

In this case, if the diagnostic connector 110 is a connector employing the OBD-II standard, the diagnostic connector 110 supports ISO, KWP, PWM, CAN, and VWP communication protocols.

Hereinafter, a communication protocol supported by the diagnostic connector 110 is defined as a first communication protocol for the explanation. Naturally, the first communication protocol may include one of ISO, KWP, PWM, CN, and VMP communication protocols.

The diagnostic equipment 200 is connected to the diagnostic connector 110 of the vehicle 100 to transmit a diagnosis message for a diagnosis request to the vehicle 100, to receive related self-diagnosis information (including operation information) from the vehicle 100 through the diagnostic connector 110, and to provide the related self-diagnosis information to a user.

In this case, the diagnostic equipment 200 supports at least one of ISO, KWP, PWM, CAN, and VWP corresponding to the communication protocol supported by the diagnostic connector 110.

For example, if the communication protocol supported by the diagnostic connector 110 is CAN, the diagnostic equipment 200 supports CAN as the communication protocol.

Accordingly, generally, the diagnostic connector 110 and the diagnostic equipment 200 are connected to each other through a cable to mutually exchange a diagnosis message or self-diagnosis information.

The diagnostic connector 110 provided in the vehicle 100 is connected to a first wireless diagnostic module 300, and the diagnostic equipment 200 is connected with a second wireless diagnostic module 400.

In more detail, the diagnostic connector 110 is provided in the vehicle 100, and a connector 210 is provided in the diagnostic equipment 200. Accordingly, according to the related art, a cable is interposed between the diagnostic connector 110 and the connector 210 to mutually connect the diagnostic connector 110 to the connector 210.

However, according to the embodiment, the first wireless diagnostic module 300 is inserted into the diagnostic connector 110, so that the communication environment of the vehicle 100 is changed into a wireless communication environment.

In addition, the second wireless diagnostic module 400 is inserted into the connector 210, so that the communication environment of the diagnostic equipment 200 is changed into a wireless communication environment.

In this case, although the first and second wireless diagnostic modules 300 and 400 are distinguished from each other, the first and second wireless diagnostic modules 300 and 400 have the same components and the same structure.

The details thereof will be described in more detail below.

The first and second wireless diagnostic modules 300 and 400 are connected to the diagnostic connector 110 of the vehicle 100 and the connector 210 of the diagnostic equipment 200, respectively, so that a signal corresponding to the first communication protocol is converted into a signal corresponding to the second communication protocol to be transmitted, or the signal corresponding to the second communication protocol is converted into the signal corresponding to the first communication protocol to be transmitted.

In this case, the second communication protocol may be a short-range communication protocol including at least one of Bluetooth, Radio Frequency Identification (RFID), Infrared Data Association (IrDA), Ultra Wideband (UWB), ZigBee, and Digital Living Network Alliance (DLNA). Alternatively, the second communication protocol may be a wireless network communication protocol including at least one of Wireless LAN (WLAN; Wi-Fi), Wireless broadband (Wibro), World Interoperability for Microwave Access (Wimax), and High Speed Downlink Packet Access (HSDPA).

Hereinafter, at least one of Bluetooth, Radio Frequency Identification (RFID), Infrared Data Association (IrDA), Ultra Wideband (UWB), ZigBee, Digital Living Network Alliance (DLNA), Wireless LAN (WLAN; Wi-Fi), Wireless broadband (Wibro), World Interoperability for Microwave Access (Wimax) and HSDPA (High Speed Downlink Packet Access (HSDPA) is defined as the second communication protocol for explanation.

In other words, the first and second wireless diagnostic modules 300 and 400 convert a diagnosis message corresponding to the first communication protocol into a diagnosis message corresponding to the second communication protocol, or convert the diagnosis message corresponding to the second communication protocol into the diagnosis message corresponding to the first communication protocol.

The diagnosis message is a message transmitted from the diagnostic equipment 200 to the vehicle 100. In other words, the diagnosis message is a request message used to request the self-diagnosis information or the operation information to the vehicle 100.

In addition, the first and second wireless diagnostic modules 300 and 400 convert self-diagnosis information corresponding to the first communication protocol into self-diagnosis information corresponding to the second communication protocol, or convert the self-diagnosis information corresponding to the second communication protocol into the self-diagnosis information corresponding to the first communication protocol.

In this case, the self-diagnosis information includes diagnosis information obtained from the ECU, or the speed, the temperature, and the RPM information of the engine.

In other words, the first and second wireless diagnostic modules 300 and 400 are connected to the conventional diagnostic equipment 200 and the vehicle 100, respectively, to provide a wireless diagnostic environment capable of wirelessly diagnosing the vehicle without changing (clearly, changing of a connector structure) or replacing the existing device (diagnostic equipment or vehicle).

Figure 3:
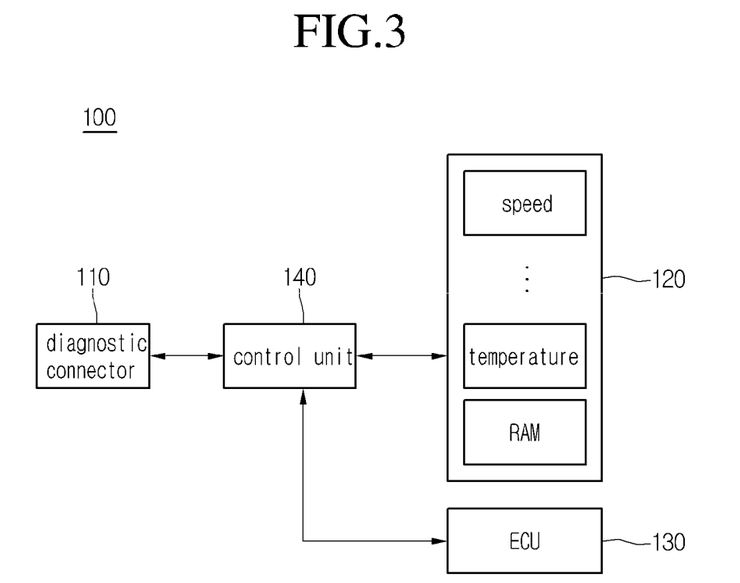
FIG. 3 is a view showing the structure of the vehicle according to the embodiment.

FIG. 3 is a view showing the structure of the vehicle 100 according to the embodiment.

Referring to FIG. 3, the vehicle 100 includes the diagnostic connector (first connector) 110, an operation information acquiring unit 120, an electronic control unit (ECU) 130, and a control unit 140.

The diagnostic connector (first connector) 110 is installed in a specific region (e.g., under of a dash board or at the lateral side of the dash board) of the vehicle 100 to provide the self-diagnosis information or the operation information of the vehicle 100 to the first wireless diagnostic module 300 connected thereto.

The operation information may include the RPM, the temperature, and the speed of an engine.

The diagnostic connector 110 is provided to all vehicles in compliance with the OBD regulation.

The diagnostic connector 110 makes self-diagnosis communication with the ECU 130 in the vehicle 100 to receive the self-diagnosis information from the ECU 130. In addition, the diagnostic connector 110 receives the operation information including the RPM, the temperature, and the speed of the engine from the operation information acquiring unit 120 and transmits the received operation information to the first wireless diagnostic module 300.

In this case, if the diagnostic connector 110 is a connector employing the OBD-II standard, the diagnostic connector 110 supports ISO, KWP, PWM, CAN, and VWP communication protocols. Hereinafter, the communication protocol supported by the diagnostic connector 110 is defined as the first communication protocol for explanation.

The operation information acquiring unit 120 acquires the operation information including the RPM, the temperature, and the speed of the engine, and provides the acquired operation information to the diagnostic connector (first connector) 110.

The ECU 130 includes an engine ECU, an ATM ECU, an ABS ECU, and an airbag ECU.

The engine ECU receives detection signals from various sensors to control the operation of the engine based on the detection signals.

The engine ECU transmits the detection signals received from the various sensors or the information of the operating state of the engine to the first wireless diagnostic module 300 through the diagnostic connector 110.

The ATM ECU serves as an automatic transmission ECU to control an automatic transmission based on the detection signals received from the various sensors. The ATM ECU transmits the received detection signals or the information of the operating state of the ATM to the first wireless diagnostic module 300.

The ABS ECU serves as an anti-lock brake system ECU to control the operation of a brake based on the detection signals received from the various sensors. The ABS ECU transmits the information of the operating state of the brake to the first wireless diagnostic module 300.

In addition, the airbag ECU controls the operation of an airbag based on the detection signals received from the various sensors. The airbag ECU transmits the received detection signals or the information of the operating state of the airbag to the first wireless diagnostic module 300.

In this case, a plurality of sensors or measuring units connected to the ECU 130 include sensors and measuring units of parts provided in various vehicles, which include a crank angle sensor, which detects the speed of an engine of a vehicle to check an idle state, a phase sensor, which detects the knocking state of the engine, a speed sensor, which detects the speed of the vehicle, an air flow meter, which measures air-intake of the engine, a temperature sensor, which measures the temperature of cooling water to diagnose the overheating of the engine, an air temperature sensor, which measures the temperature of intake air for the purpose of the optimal fuel injection, a throttle position sensor, which measures the opening angle of the throttle, a map sensor, which measures the pressure of the intake air, an oxygen sensor, which measures exhaust fumes, an injector for fuel injection, a main/fuel pump relay, which measures the driving of a fuel pump and the erroneous state of a relay, and an idle speed controller which controls the idle of the engine.

The control unit 140 controls the overall operation of the vehicle 100.

In particular, the control unit 140 provides the self-diagnosis information, which is acquired through the operation information acquiring unit 120 or the ECU 130, to the first wireless diagnostic module 300 through the diagnostic connector 110, in response to the diagnosis message received through the diagnostic connector 110.

In this case, the provided self-diagnosis information is based on the first communication protocol.

Figure 4:
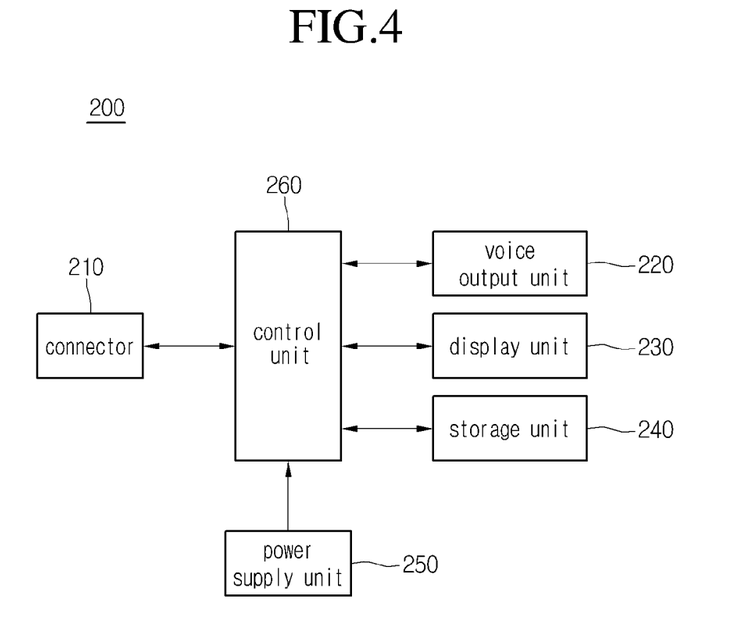
FIG. 4 is a block diagram showing the structure of the diagnostic equipment according to the embodiment.

FIG. 4 is a block diagram showing the structure of the diagnostic equipment 200 according to the embodiment.

Referring to FIG. 4, the diagnostic equipment 200 includes a connector (second connector) 210, a voice outputting unit 220, a display unit 230, a storage unit 240, a power supply unit 250, and a control unit 260.

The connector 210 is connected to the diagnostic connector 110 of the vehicle 100, and transmits a diagnosis message for a diagnosis request to the vehicle 100 to receive self-diagnosis information (including operation information) from the vehicle 100 through the diagnostic connector 110.

In this case, actually, the connector 210 is connected to the second wireless diagnostic module 400 to provide a wireless communication environment.

In other words, the connector 210 is connected to the second wireless diagnostic module 400 defined as a relay unit to receive the self-diagnosis information through the first wireless diagnostic module 300 connected to the diagnostic connector (first connector) 110.

In this case, the connector 210 supports at least one of ISO, KWP, PWM, CAN, and VWP corresponding to the communication protocol supported by the diagnostic connector 110.

For example, if the communication protocol supported by the diagnostic connector 110 is CAN, the diagnostic equipment 200 supports CAN as the communication protocol.

The voice outputting unit 220 generates voice to inform the self-diagnosis information received through the connector 210, based on the self-diagnosis information.

For example, the voice outputting unit 220 includes a mechanical or electronic voice generator that receives the operation information, the information of the driving state of the vehicle, the information of a part state, or information related to the replacement of consumables and generates voice for warning based on the received information.

The display unit 230 outputs a video to inform the self-diagnosis information received through the connector 210, based on the self-diagnosis information.

In this case, the display unit 230 may be implemented by using a PDP, an LCD, an OLED, or a flexible display.

The storage unit 240 may store programs for the processing and the controlling of signals in the control unit 260, and may store a video signal or a voice signal subject to signal processing.

The storage unit 240 may include a storage medium having at least one of a flash memory type, a hard disk type, a multimedia card micro-type, a card-type memory (e.g., an SD memory or an XD memory), a RAM, and a ROM (EEPROM).

The power supply unit 250 supplies power available to the diagnostic equipment 200.

The control unit 260 controls the overall operation of the diagnostic equipment 200.

In particular, the control unit 260 outputs the diagnosis message to the second wireless diagnostic module 400 connected to the connector 210 according to the request of a driver.

In this case, the diagnosis message may include information representing the diagnosis state and the operation state of each part of the vehicle. For example, the diagnosis message may include a vehicle engine speed detection signal, an engine knocking detection signal, a vehicle speed detection signal, a measurement signal of air-intake of an engine, a measurement signal of cooling water temperature to diagnose an over-heated engine, a temperature measurement signal of intake air for the optimal fuel injection, a measurement signal of an opening angle of a throttle, a pressure measurement signal of intake air, an exhaust gas measurement signal, signals related to operating states of an injector for fuel injection, a fuel pump, and a relay, and measurement signals of various vehicle components such as an idle speed controller to control the idling of an engine.

In addition, if the self-diagnosis information is received through the second wireless diagnostic module 400 in response to the diagnosis message, the control unit 260 allows the voice outputting unit 220 and the display unit 230 to output signals corresponding to the received self-diagnosis information.

Figure 5:
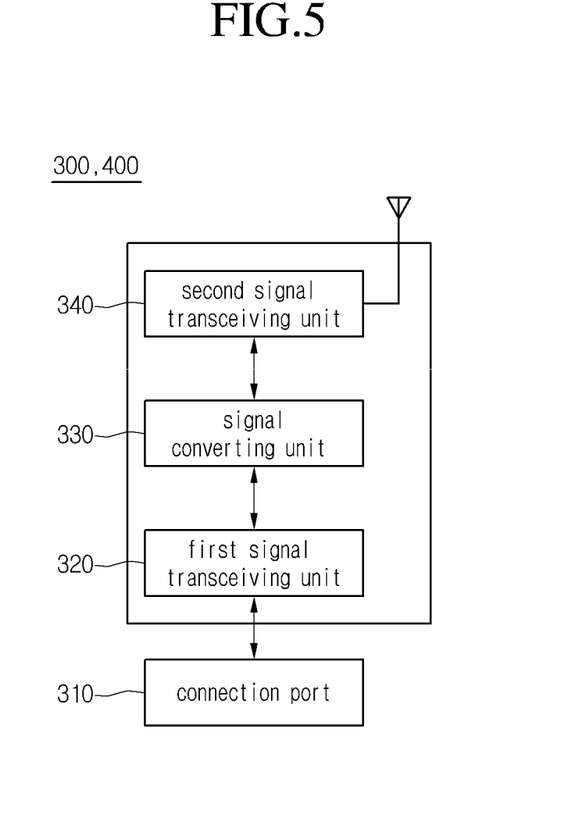
FIG. 5 is a block diagram showing the wireless diagnostic module according to the embodiment.

FIG. 5 is a block diagram showing the wireless diagnostic module according to the embodiment.

The wireless diagnostic module shown in FIG. 5 may include the first wireless diagnostic module 300 connected to the diagnostic connector (first connector) 110 of the vehicle 100. Alternatively, the wireless diagnostic module shown in FIG. 5 may include the second wireless diagnostic module 400 connected to the connector 210 of the diagnostic equipment 200.

The wireless diagnostic module 300 or 400 includes a connection port 310, a first signal transceiving unit 320, a signal converting unit 330, and a second signal transceiving unit 340.

The connection port 310 is connected to the diagnostic connector (first connector) 110 of the vehicle 100 or connected to the connector 210 of the diagnostic equipment 200.

In other words, if the wireless diagnostic module is the first wireless diagnostic module 300, the connection port 310 is connected to the diagnostic connector (first connector) 110 of the vehicle 100. Alternatively, if the wireless diagnostic module is the second wireless diagnostic module 400, the connection port 310 is connected to the connector 210 of the diagnostic equipment 200.

In other words, the connection port 310 is connected to connectors varying depending on places, in which the wireless diagnostic module is used, to receive a signal based on the first communication protocol (e.g., ISO, KWP, PWM, CAN, or VWP).

The first signal transceiving unit 320 receives the signal corresponding to the first communication protocol from the connection port 310 to transmit the signal to the signal converting unit 330, or receives the signal corresponding to the first communication protocol from the signal converting unit 330 to transmit the signal to the connection port 310.

In other words, if the wireless diagnostic module is the first wireless diagnostic module 300, the first signal transceiving unit 320 may receive self-diagnosis information corresponding to the first communication protocol from the connection port 310 and transmit the self-diagnosis information to the signal converting unit 330. Conversely, the first signal transceiving unit 320 may receive a diagnosis message corresponding to the first communication protocol from the signal converting unit 330 and transmit the diagnosis message to the connection port 310. In this case, the connection port 310 has the shape and the structure corresponding to those of the diagnostic connector 110.

Alternatively, if the wireless diagnostic module is the second wireless diagnostic module 400, the first signal transceiving unit 320 may receive a diagnosis message corresponding to the first communication protocol from the connection port 310 and transmit the diagnosis message to the signal converting unit 330. Conversely, the first signal transceiving unit 320 may receive the self-diagnosis information corresponding to the first communication protocol from the signal converting unit 330 and transmit the self-diagnosis information to the connection port 310. In this case, the connection port 310 has the shape and the structure corresponding to those of the connector 210.

The signal converting unit 330 converts a signal corresponding to the first communication protocol into a signal corresponding to the second communication protocol according to communication environments. Conversely, the signal converting unit 330 converts the signal corresponding to the second communication protocol into the signal corresponding to the first communication protocol.

The second signal transceiving unit 340 transmits a signal corresponding to the second communication protocol, which is converted by the signal converting unit 330, to the outside. In addition, the second signal transceiving unit 340 receives a signal corresponding to the second communication protocol from the outside and outputs the signal to the signal converting unit 330.

In other words, if the wireless diagnostic module is the first wireless diagnostic module 300, the second signal transceiving unit 340 may receive self-diagnosis information corresponding to the second communication protocol from the signal converting unit 330 and transmit the self-diagnosis information to the outside (the second wireless diagnostic module 400). Conversely, the second signal transceiving unit 340 may receive a diagnosis message corresponding to the second communication protocol from the outside (second wireless diagnostic module 400) and transmit the diagnosis message to the signal converting unit 330.

In addition, if the wireless diagnostic module is the second wireless diagnostic module 400, the second signal transceiving unit 340 may receive a diagnosis message corresponding to the second communication protocol from the signal converting unit 330, and transmit the diagnosis message to the outside (first wireless diagnostic module 300). Conversely, the second signal transceiving unit 340 may receive self-diagnosis information corresponding to the second communication protocol from the outside (first wireless diagnostic module 300) and transmit the self-diagnosis information to the signal converting unit 330.

As described above, the wireless diagnostic module 300 or 400 is connected to the diagnostic connector (first connector) 110 of the vehicle 100 or connected to the connector 210 of the diagnostic equipment 200 according to the used environments, thereby providing a wireless communication environment to the vehicle 100 or the diagnosis equipment 200.

Figure 6:
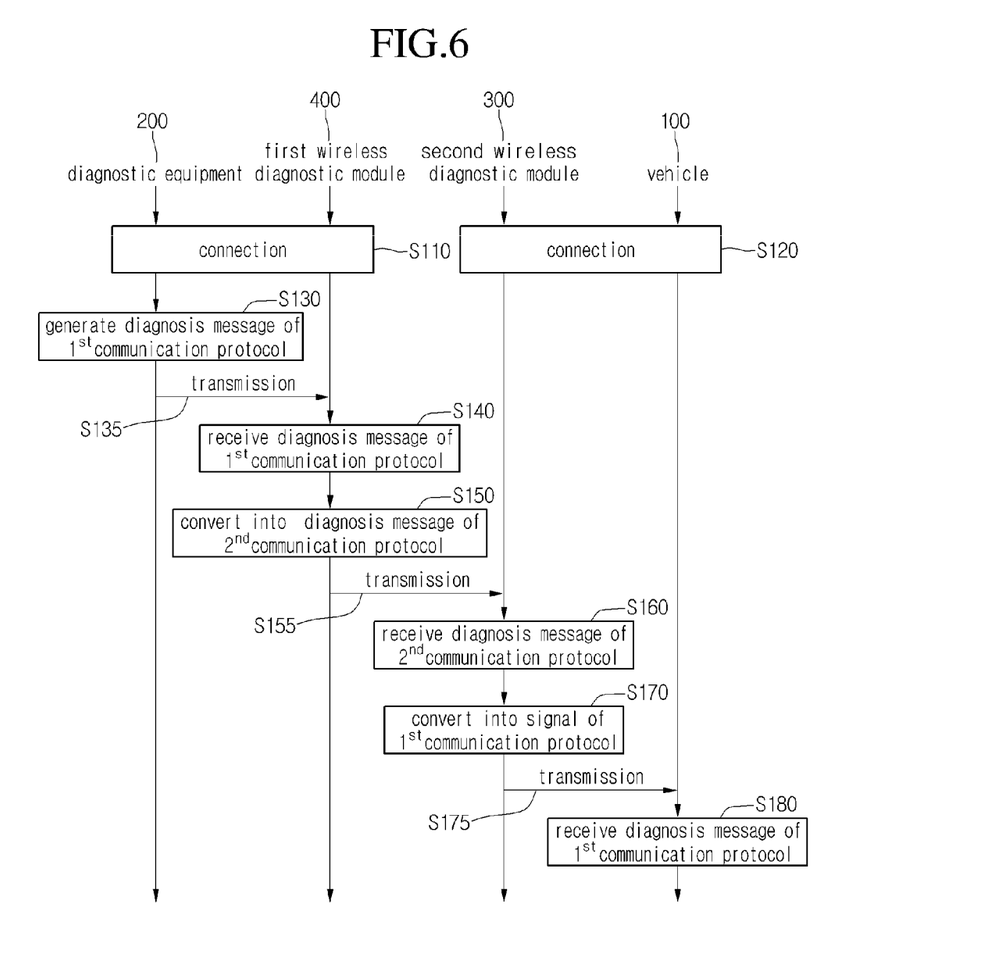
FIGS. 6 and 7 are views to explain a wireless diagnosis method according to the embodiment step by step.
Figure 7:
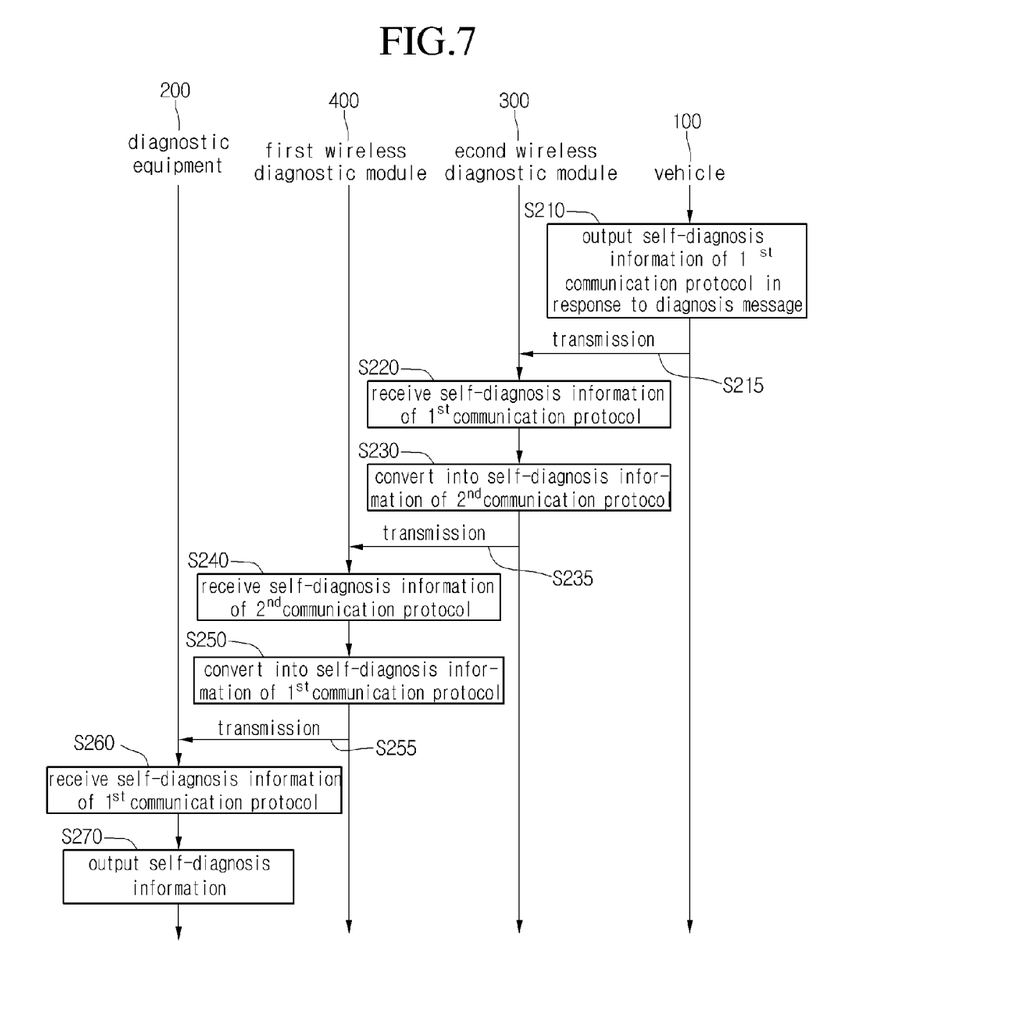

FIGS. 6 and 7 are views to explain a wireless diagnosis method according to the embodiment step by step.

FIG. 6 is a view to explain the process of transmitting from the diagnostic equipment 200 to the vehicle 100.

Referring to FIG. 6, the diagnostic equipment 200 and the second wireless diagnostic module 400 are connected to each other, and the first wireless diagnostic module 300 and the vehicle 100 are connected to each other.

The second wireless diagnostic module 400 provides the wireless communication environment of the diagnostic equipment 200, and the first wireless diagnostic module 300 provides the wireless communication environment of the vehicle 100.

The diagnostic equipment 200 generates a diagnosis message corresponding to the first communication protocol according to the request of a driver (step S130).

Thereafter, the diagnosis message generated by the diagnostic equipment 200 is transmitted to the second wireless diagnostic module 400 connected to the diagnostic equipment 200 (step S135).

The second wireless diagnostic module 400 receives the transmitted diagnosis message (step S140). In this case, the received diagnosis message is a signal corresponding to the first communication protocol transmitted through the diagnostic equipment 200.

Thereafter, the second wireless diagnostic module 400 converts the received diagnosis message into a signal corresponding to the second communication protocol (step S150).

The second wireless diagnostic module 400 wirelessly transmits the converted diagnosis message through an antenna after the signal conversion has been performed (step S155), so that the transmitted diagnosis message is received in the first wireless diagnostic module 300 connected to the vehicle 100 (step S160).

The first wireless diagnostic module 300 converts the received signal corresponding to the second communication protocol into a signal corresponding to the first communication protocol (step S170).

In other words, the first wireless diagnostic module 300 converts the received diagnosis message into a signal corresponding to the first communication protocol which is initially generated in the diagnostic equipment 200.

Thereafter, the converted diagnosis message is transmitted to the vehicle 100 (step S175), so that the vehicle 100 receives the diagnosis message corresponding to the first communication protocol, which is generated in the diagnostic equipment 200, through the diagnostic connector 110 (step S180).

FIG. 7 is a view to explain the process of transmitting self-diagnosis information from the vehicle 100 to the diagnostic equipment 200.

Referring to FIG. 7, the vehicle 100 generates and outputs self-diagnosis information corresponding to the first communication protocol, in response to the diagnosis message transmitted through the diagnostic equipment 200 (step S210).

Thereafter, the self-diagnosis information generated through the vehicle 100 is transmitted to the first wireless diagnostic module 300 connected to the vehicle 100 (step S215).

The first wireless diagnostic module 300 receives the self-diagnosis information (step S220). In this case, the received self-diagnosis information is a signal corresponding to the first communication protocol transmitted through the vehicle 200.

Thereafter, the first wireless diagnostic module 300 converts the received self-diagnosis information into a signal corresponding to the second communication protocol (step S230).

The first wireless diagnostic module 300 wirelessly transmits the converted self-diagnosis information through the antenna after the signal conversion has been performed (step S235), so that the self-diagnosis information is received by the second wireless diagnostic module 400 connected to the diagnostic equipment 200 (step S240).

The second wireless diagnostic module 400 converts the signal corresponding to the received second communication protocol into a signal corresponding to the first communication protocol (step S250).

In other words, the second wireless diagnostic module 400 converts the received self-diagnosis information into a signal corresponding to the first communication protocol which is initially generated from the vehicle 100.

Thereafter, the converted self-diagnosis information is transmitted to the diagnostic equipment 200 (step S255), so that the diagnostic equipment 200 receives the self-diagnosis information corresponding to the first communication protocol generated from the vehicle 100 (step S260).

Next, the diagnostic equipment 200 outputs or stores the received self-diagnosis information (step S270).

According to the embodiment, since the external diagnostic equipment of the vehicle is wirelessly connected to the internal CAN network system of the vehicle, a user may not open the door of the vehicle to connect the diagnostic equipment to the diagnostic connector in every self-diagnosis.

In addition, according to the embodiment, since the diagnostic equipment is wirelessly connected to the vehicle, the working radius for the self-diagnosis is not restricted. Accordingly, the self-diagnosis of the vehicle can be more effectively performed.

In addition, according to the embodiment, the wireless diagnostic module, which can be connected to existing diagnostic equipment and a vehicle, is provided, thereby providing a wireless diagnostic environment capable of wirelessly diagnosing a vehicle without the change or the replacement of an existing device.

The wireless diagnostic module, the wireless diagnostic system, and the wireless method are not limited to the above embodiments, but the combination of a part of the embodiments or all embodiments is selectively used so that various modifications of the embodiments can be provided Meanwhile, the wireless diagnostic method according to the embodiment may be implemented in the form of process-readable codes in process-readable recording media provided in a vehicle or diagnostic equipment. The process-readable recording media include all types of recording units in which process-readable data are stored. For example, the process-readable recording media may include a ROM, a RAM, a CD-ROM, a magnetic tape, a floppy disk, an optical data storage unit, and the like and, in addition, include a type of a carrier wave such as transmission through the Internet. In addition, the process-readable recording media are distributed on computer systems connected through the network, and thus the process-readable recording media may be stored and executed as the process-readable code by a distribution scheme.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

What is claimed is:

1. A wireless diagnostic module comprising:
a first wireless diagnostic module detachably connected to an on-board diagnostic (OBD) connector of a vehicle; and
a second wireless diagnostic module detachably connected to a connector of a diagnostic equipment,
wherein the first wireless diagnostic module is configured to:
receive a first signal corresponding to a first communication protocol from the OBD connector;
convert the first signal into a second signal corresponding to a second communication protocol;
transmit the second signal to the second wireless diagnostic module;
receive a third signal corresponding to the second communication protocol from the second wireless diagnostic module;
convert the third signal into a fourth signal corresponding to the first communication protocol; and
output the fourth signal via the OBD connector,
wherein the second wireless diagnostic module is configured to:
receive the fourth signal via the connector of the diagnostic equipment;
convert the fourth signal into the third signal;
transmit the third signal to the first wireless diagnostic module;
receive the second signal via the connector of the diagnostic equipment;
convert the second signal into the first signal; and
output the first signal via the connector of the diagnostic equipment,
wherein the first communication protocol comprises at least ISO, KWP, PWM, CAN or VWP supported by the OBD connector, and
wherein the second communication protocol comprises a wireless communication protocol for wireless communication between the vehicle and the diagnostic equipment.

2. The wireless diagnostic module of one claim 1, wherein:
the first wireless diagnostic module comprises a first connection port having a shape corresponding to a shape of the OBD connector and is inserted into the OBD connector; and
the second wireless diagnostic module comprises a second connection port having a shape corresponding to a shape of the connector of the diagnostic equipment and is inserted into the connector of the diagnostic equipment.

3. The wireless diagnostic module of claim 1, wherein:
the fourth signal is a diagnosis message for diagnosis of the vehicle; and
the first signal includes self-diagnosis information generated in response to the diagnosis message.

4. The wireless diagnostic module of claim 1, wherein:
the third signal is a diagnosis message for diagnosis of the vehicle; and the second signal includes self-diagnosis information of the vehicle generated in response to the diagnosis message.

5. The wireless diagnostic module of claim 1, wherein the second communication protocol comprises at least Bluetooth™, Radio Frequency Identification (RFID), Infrared Data Association (IrDA), Ultra Wideband (UWB), ZigBee™, Digital Living Network Alliance (DLNA), Wireless LAN (Wi-Fi), Wireless broadband (Wibro), World Interoperability for Microwave Access (Wimax) or High Speed Downlink Packet Access (HSDPA).

6. The wireless diagnostic module of claim 3, wherein the self-diagnosis information comprises at least video or voice.

7. The wireless diagnostic module of claim 4, wherein the self-diagnosis information comprises at least video or voice.

8. A wireless diagnostic system comprising:
a vehicle comprising an on-board diagnostic (OBD) connector;
a diagnostic equipment comprising a connector;
a first wireless diagnostic module detachably connected to the OBD connector; and
a second wireless diagnostic module detachably connected to the connector of the diagnostic equipment,
wherein the first wireless diagnostic module is configured to
  receive a first signal corresponding to a first communication protocol from the OBD connector;
  convert the first signal into a second signal corresponding to a second communication protocol;
  transmit the second signal to the second wireless diagnostic module;
  receive a third signal corresponding to the second communication protocol from the second wireless diagnostic module;
  convert the third signal into a fourth signal corresponding to the first communication protocol; and
  output the fourth signal via the OBD connector,
wherein the second wireless diagnostic module is configured to:
  receive the fourth signal via the connector of the diagnostic equipment;
  convert the fourth signal into the third signal;
  transmit the third signal to the first wireless diagnostic module;
  receive the second signal via the connector of the diagnostic equipment; and
  convert the second signal into the first signal; and
  output the first signal via the connector of the diagnostic equipment,
wherein the first communication protocol comprises at least ISO, KWP, PWM, CAN or VWP supported by the OBD connector, and
wherein the second communication protocol comprises a wireless communication protocol for wireless communication between the vehicle and the diagnostic equipment.

9. The wireless diagnostic system of claim 8, wherein the second communication protocol comprises at least Bluetooth™, Radio Frequency Identification (RFID), Infrared Data Association (IrDA), Ultra Wideband (UWB), ZigBee™, Digital Living Network Alliance (DLNA), Wireless LAN (Wi-Fi), Wireless broadband (Wibro), World Interoperability for Microwave Access (Wimax) or High Speed Downlink Packet Access (HSDPA).

10. The wireless diagnostic system of claim 8, wherein:
the first wireless diagnostic module comprises a first connection port having a shape corresponding to a shape of the OBD connector; and
the second wireless diagnostic module comprises a second connection port having a shape corresponding to a shape of the connector of the diagnostic equipment.

11. The wireless diagnostic system of claim 8, wherein:
the fourth signal is a diagnosis message for diagnosis of the vehicle; and
the first signal includes self-diagnosis information generated in response to the diagnosis message.

12. The wireless diagnostic system of claim 8, wherein:
the third signal is a diagnosis message for diagnosis of the vehicle; and
the second signal includes self-diagnosis information of the vehicle generated in response to the diagnosis message.

13. The wireless diagnostic system of claim 11, wherein the self-diagnosis information comprises at least video or voice.

14. The wireless diagnostic system of claim 12, wherein the self-diagnosis information comprises at least video or voice.

* * * * *